(12) United States Patent
Foster et al.

(10) Patent No.: US 9,238,424 B1
(45) Date of Patent: Jan. 19, 2016

(54) SEAT CUSHION

(71) Applicant: Burley Design LLC, Eugene, OR (US)

(72) Inventors: Vance Foster, Eugene, OR (US); Jove Lachman-Curl, Eugene, OR (US); Aaron P. Beese, Eugene, OR (US)

(73) Assignee: Burley Design LLC, Eugene, OR (US)

( * ) Notice: Subject to any disclaimer, the term of this patent is extended or adjusted under 35 U.S.C. 154(b) by 18 days.

(21) Appl. No.: 14/473,843

(22) Filed: Aug. 29, 2014

Related U.S. Application Data (60) Provisional application No. 61/941,392, filed on Feb. 18, 2014.

(51) Int. Cl.
| | |
|---|---|
| *B60R 22/00* | (2006.01) |
| *B60N 2/26* | (2006.01) |
| *B60N 2/58* | (2006.01) |
| *B62B 9/00* | (2006.01) |

(52) U.S. Cl.
CPC .............. *B60N 2/265* (2013.01); *B60N 2/5833* (2013.01); *B62B 9/00* (2013.01)

(58) Field of Classification Search
CPC ...... B60N 2/60; B60N 2/6009; B60N 2/6063; B60N 2/2803; B60N 2/2881; B60N 2/265; B60N 2/5833; B62B 9/00; B60R 2022/006; B60R 22/10
See application file for complete search history.

(56) References Cited

U.S. PATENT DOCUMENTS

| | | | | |
|---|---|---|---|---|
| 5,161,258 | A * | 11/1992 | Coltrain ................ | B60R 22/105 2/102 |
| 5,429,418 | A * | 7/1995 | Lipper .................. | B60R 22/105 297/465 |
| 6,322,149 | B1 * | 11/2001 | Conforti ............... | B60R 22/024 297/482 |
| 6,951,367 | B1 * | 10/2005 | Dinnan .................. | B60N 2/449 297/228.1 |
| 7,410,213 | B1 * | 8/2008 | Ferrari-Cicero ......... | B60N 2/60 297/219.12 |
| 7,748,780 | B2 * | 7/2010 | Sizemore ............. | B60N 2/2881 297/219.12 |
| 8,888,180 | B2 * | 11/2014 | Popovic ............... | A47C 31/113 297/219.12 |
| 2002/0074847 | A1 * | 6/2002 | Terpselas ................ | B60R 22/14 297/483 |
| 2011/0049950 | A1 * | 3/2011 | Pereira .................. | B60N 2/2812 297/219.12 |
| 2011/0248532 | A1 * | 10/2011 | Kim ........................ | A47C 7/748 297/180.11 |

* cited by examiner

*Primary Examiner* — Philip Gabler
(74) *Attorney, Agent, or Firm* — Klarquist Sparkman, LLP (57) ABSTRACT

A seat cushion is provided with seat belt strap engaging arms operable to engage and spread the lap belt and shoulder belt straps, if present, of a seat belt structure away from the center of the stroller or other seat to provide easier access to place a user of the seat in the seat. Installation of the cushion is facilitated in one embodiment by adapting the arms to be detachably coupled to seat belt and shoulder belt straps. As a result, the cushion can be placed in the seat and the arms coupled to the straps without the need to undo the straps of the seat belt structure before use of the cushion.

21 Claims, 10 Drawing Sheets

SEAT CUSHION

CROSS REFERENCE TO RELATED APPLICATION

This application claims the benefit of U.S. Provisional Application Ser. No. 61/941,392, entitled SEAT CUSHION, filed on Feb. 18, 2014.

TECHNICAL FIELD

This disclosure relates to seat cushions such as for car seats, strollers or jogging strollers, and specifically to seat cushions with features that engage and facilitate the use of seat belt harnesses used in such products.

BACKGROUND

It can be difficult to position individuals, especially toddlers, in a car seat or stroller that has a seat belt structure. That is, a person while holding the child, must often move seat belt straps out of the way using one hand in order to create space to position the child in the seat without the child sitting on seat belts. This task is even more difficult with modern seat belt structures that have both lap belts and shoulder straps that are designed to be buckled together over the stomach area of the child.

SUMMARY

In accordance with this disclosure, a seat cushion is provided with seat belt strap engaging arms operable to engage and spread the lap belt and shoulder belt straps, if present, of a seat belt structure away from the center of the stroller or other seat to provide easier access to place a user of the seat in the seat. In accordance with one embodiment, the cushion is configured to fit a wide variety of seats. Installation of the cushion is facilitated in one embodiment by adapting the arms to be detachably coupled to seat belt and shoulder belt straps. As a result, the cushion can be placed in the seat and the arms coupled to the straps without the need to undo the straps of the seat belt structure before use of the cushion. Consequently, the cushion can easily be moved from one seat to another and can also be removed for cleaning.

In accordance with an embodiment, a seat cushion comprises: a body comprising a central portion, first and second side portions and first and second end portions; first and second elongated spaced apart shoulder strap engaging members projecting outwardly from the first end portion of the body; a first elongated lap belt strap engaging member projecting outwardly from the first side portion of the body; a second elongated belt strap engaging member projecting outwardly from the second side portion of the body; an elongated crotch belt strap engaging member projecting outwardly from the second end portion of the body; the first and second elongated shoulder strap engaging members each having a proximal end portion coupled to the first end portion of the body and a distal end portion; the first and second lap belt strap engaging members each having a proximal end portion and a distal end portion, the proximal end portion of the first lap belt strap engaging member being coupled to the first side portion of the body, and the proximal end portion of the second lap belt strap engaging member second lap belt strap engaging member being coupled to the second side portion of the body; a first shoulder strap biasing element coupled to the body and to the first shoulder strap engaging member and configured to bias the distal end portion of the first shoulder strap engaging member away from the body; a second shoulder strap biasing element coupled to the body and to the second shoulder strap engaging member and configured to bias the distal end portion of the second shoulder strap engaging member away from the body; a first lap belt strap biasing element coupled to the body and to the first lap belt strap engaging member and configured to bias the distal end portion of the first lap belt strap engaging member away from the central portion of the body; and a second lap belt strap biasing element coupled to the body and to the second lap belt strap engaging member and configured to bias the distal end portion of the second lap belt strap engaging member away from the central portion of the body.

According to an aspect of an embodiment, the crotch belt strap engaging member comprises a proximal end portion coupled to the second end portion of the body and a distal end portion, the seat cushion further comprising a crotch belt strap biasing element coupled to the body and to the crotch belt strap engaging member and configured to bias the distal end portion of the crotch belt strap engaging member away from the central portion of the body.

According to another aspect of an embodiment, the first and second shoulder strap biasing elements, the first and second lap belt strap biasing elements, and the crotch belt strap biasing element, if included, each exert a biasing force of from 0.4 Newtons to 1.08 Newtons. These biasing elements can comprise elastic strips and can also comprise batting strips.

As a still further aspect of an embodiment, the first shoulder strap engaging member defines a first strap receiving opening that receives a first shoulder strap of a seat belt structure, the second shoulder strap engaging member defines a second strap receiving opening that receives a second shoulder strap of a seat belt structure, a first lap belt strap engaging member defines a third strap receiving opening that receives a first lap belt strap of a seat belt structure, the second lap belt strap engaging member defines a fourth strap receiving opening that receives a second lap belt strap of a seat belt structure, and the crotch belt strap engaging member defines a fifth strap receiving opening that receives a crotch belt strap of a seat belt structure.

The first, second, third and fourth strap receiving openings can each be bounded by a respective associated sleeve, each sleeve comprising a first sleeve forming portion and a second sleeve forming portion that are detachably coupled together to form the sleeve and that are detachable from one another such that the first and second sleeve forming portions are separable from one another to receive a respective associated shoulder or lap belt strap and detachably coupled together to form the sleeve and define the strap receiving opening for the associated shoulder strap or seat belt strap. In addition, the shoulder straps and lap belt straps can be slidable within their associated sleeve.

As yet another aspect of an embodiment, the first and second shoulder strap engaging members and the first and second lap belt strap engaging members can each comprise an enlarged distal end portion, the enlarged distal end portion comprising a first section and a second section, the first section being coupled to the second section to define the strap receiving opening. In addition, the first and second sections can be detachably coupled together to form the strap receiving opening. In one specific form, a portion of one of the first and second sections is folded over the other of the first and second sections and the folded over portion of said one of the first and second sections is detachably coupled to said other of the first and second sections.

As another aspect of an embodiment, the body comprises a front portion and a back portion, the back portion facing a seat that has a seat belt structure with first and second shoulder straps, first and second lap belt straps and a crotch belt strap, the back portion of the body comprising fasteners that are operable to detachably mount the body to the seat. The fasteners can comprise a plurality of elongated hook and eye fabric strips positioned to engage corresponding hook and eye fabric strips on the seat.

As yet another aspect of an embodiment, the body can comprise a front cover, a back cover and padding between the front and back covers.

As a further aspect, the seat cushion can be combined with a seat having a seat belt structure.

In addition, all possible combinations and sub-combinations of the above elements can be included in various embodiments.

These and other aspects of inventive features of the present invention will be more apparent from the description and drawings below.

BRIEF DESCRIPTION OF THE DRAWINGS

FIG. 4 also illustrates optional elastic straps extending from the respective arms to the body of the cushion for pulling the arms to extended positions shown in FIG. 3, upwardly and outwardly away from the body of the cushion. An optional strap is shown in dashed lines coupled to the crotch projection of FIG. 4. It should be noted that other biasing mechanisms can be used instead of or in addition to the elastic straps.

DETAILED DESCRIPTION

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the term "includes" has the same meaning as "comprises".

The cushion is described below in connection with an exemplary use in a stroller, such as a jogging stroller. These cushions can be used in other applications as well, such as in car seats, infant carriers, wheelchairs and the like. It should be noted that the tend cushion is not limited to a padded cushion embodiment as the term cushion encompasses a substantially rigid material, such as comprising a polymer material, and/or comprised of a single or multi-layered flexible sheet stock, such as fabric. In a desirable form, the cushion is padded with foam or batting material. The cushion can be an integrated or unitary portion of a stroller, car seat or other product eat. Alternatively, the cushion can be loosely placed on the seat of such a product. In a desirable form, the cushion is detachably coupled to the seat, meaning that it can be separated from and removed from the seat.

Figure 1:
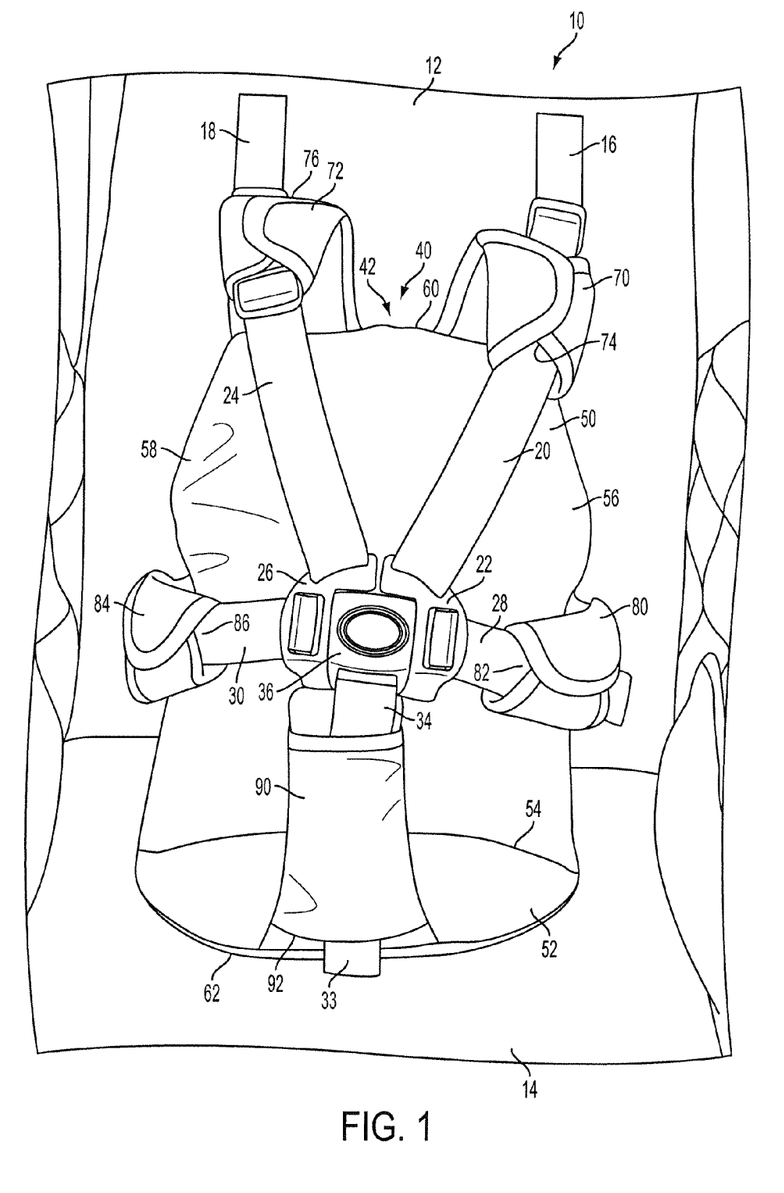
FIG. 1 illustrates an exemplary embodiment of a seat belt cushion in accordance with this disclosure, shown positioned on a jogging stroller seat and with a seat belt shown in a belted condition.
Figure 2:
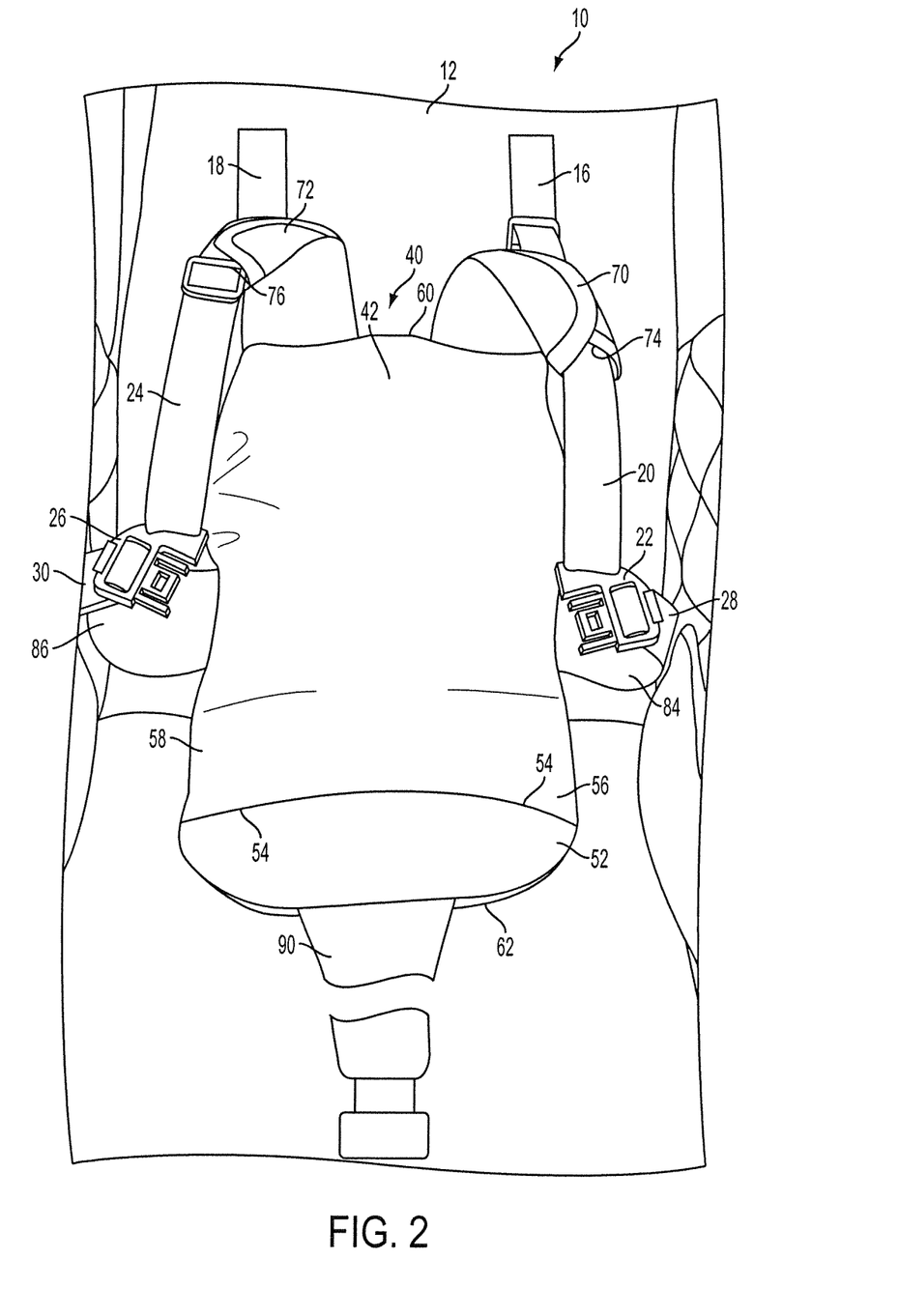
FIG. 2 is similar to FIG. 1, except that FIG. 2 illustrates the seat belt structure in an unsnapped or unbuckled condition to show how arms of the cushion assist in moving the seat belt straps away from the cushion to facilitate placing a child on the seat cushion prior to buckling the seat belt.

With reference to FIGS. 1 and 2, the interior seat of a jogging stroller 10 is shown. The jogging stroller seat has a main upper support 12 for supporting the back of a child (or other user) placed in the jogging stroller. In addition, the jogging stroller includes a seat portion 14 for supporting the seat of the child placed in the jogging stroller. The jogging stroller is provided with a seat belt structure for holding the child in position within the stroller. The seat belt construction of FIGS. 1 and 2 comprises a first shoulder strap portion 16 and a second shoulder strap portion 18. The strap portions 16, 18 are coupled to the stroller and extend downwardly from the upper back portion of the jogging stroller. A lower portion 20 of the shoulder strap 16 is coupled to a first buckle section 22 at the right side of FIG. 2. A lower portion 24 of the shoulder strap 18 is coupled to a buckle section 26 at the left side of the stroller seat of FIG. 2.

In addition, a first lap belt strap 28 extends upwardly from the middle of the stroller toward the buckle section 22 and into engagement with this buckle section. Also, a second lap belt strap 30 extends upwardly from the middle of the stroller and into engagement with the buckle section 26. The lap belt straps are also coupled to the stroller.

As best seen in FIG. 1, a lower crotch engaging strap portion 34 of the seat belt structure 34 extends upwardly from the jogging stroller and is coupled to a buckle component 36. The strap portion 34 has a lower portion 33 coupled to the stroller. The buckle component 36 is designed to receive the buckle components 22 and 26 when the seat belt assembly is buckled as shown in FIG. 1. The seat belt structure is conventional. Other alternative seat belt configurations can be used. The strap portions 16, 18, 28, 30 and 33 can pass behind the stroller structure and, if desired, can comprise one or more loops that are joined together to form the seat belt construction.

With continued reference to FIGS. 1 and 2, the illustrated embodiment of a cushion 40 comprises a main body 42 having an upper body portion 50 and a lower body portion 52. A fold may be stitched into or otherwise provided in body 50, such as the curved fold indicated at 54 in these figures. The fold is optional, but does assist in conforming the cushion to fit the seat in which it is disposed.

The cushion body 42 comprises first and second side edge portions 56, 58 and first and second end portions 60, 62.

In addition, the cushion 40 further comprises first and second elongated spaced apart shoulder strap engaging members such as arms 70, 72 projecting outwardly from a first end portion of the body, in this example from end portion 60. Alternatively, these arms can extend outwardly from other locations of the cushion body. The shoulder strap engaging members 70, 72 are each configured in this example to fold over and define an opening, channel or sleeve for the respective shoulder straps 20, 24 to extend therein or therethrough. The opening or sleeve associated with shoulder strap engaging member 70 for shoulder strap 20 is indicated at 74 in these figures. In addition, the opening or sleeve associated with shoulder strap engaging member 72 for shoulder strap 24 is indicated at 76 in these figures. The shoulder strap engaging members in the illustrated embodiment each comprise a proximal end portion coupled to the body and a distal end portion. The proximal end portions can be joined together and the joined elements connected to the body. This is within the meaning of the proximal end portion coupled to the body.

In addition, the illustrated cushion construction comprises a first elongated lap belt strap engaging member or arm 80 projecting outwardly from one of the side edges, in this example from side edge portion 56, of the cushion body 50. The element 80 also folds over and envelops the strap 28 to define a lap belt strap receiving opening, channel or sleeve such as the opening or sleeve indicated at 82 in FIG. 1. A second elongated lap belt strap engaging member or arm 84 projects outwardly from a second side portion, in this example from side edge portion 58, of the body. Lap belt engaging member 84 also folds over and envelops the lap belt strap 30 and defines a strap receiving opening, channel or sleeve such as opening or sleeve 86 through which the lap belt strap 30 extends. The arms 80, 84 can extend outwardly from alternative portions of the cushion body. The lap belt strap engaging members in the illustrated embodiment each have a proximal end portion coupled to the body and a distal end portion, and can be joined together at the proximal end portions as explained above in connection with the shoulder strap engaging members.

An elongated crotch belt strap engaging member or arm 90 projects outwardly from the second end portion, in this example from end portion 62, of the body. When installed, the crotch belt strap engaging member folds upwardly as shown in FIG. 1 and would be positioned between the legs of the child using the seat cushion. The crotch belt receiving element 90 also defines an opening, channel or sleeve 92 through which the crotch belt strap 34 can be extended. The illustrated crotch belt engaging member has a proximal end portion coupled to the body and a distal end portion.

It should be noted that the inventive features shown herein are applicable to cushions with only lap belt strap engaging arm members, with lap belt and shoulder strap engaging arms members, and with lap best and shoulder strap engaging arm members together with a crotch strap engaging arm member.

With this construction, the respective first and second shoulder strap engaging members, the first and second lap belt strap engaging members, as well as the crotch belt strap engaging member, cooperate to respectively engage associated shoulder straps, lap belt straps and the crotch strap of the seat belt construction. Also, desirably the strap engaging members are slidably coupled to the straps to permit relative movement of the straps and strap engaging arms.

The respective first and second shoulder strap engaging members each comprise a respective one or more biasing members or elements. In addition, the first and second lap belt engaging members also each comprise a respective one or more biasing members or elements. Alternatively, only selected ones of the strap engaging elements, such as the opposed lap belt engaging elements may have such biasing members. These biasing members are configured to urge the associated shoulder strap engaging members and lap belt engaging members away from the seat cushion body when the seat belt is disconnected. This is shown in FIG. 2. The crotch belt strap, because of its positioning, will tend to extend away from the cushion without a biasing member because of the influence of gravity. However, one or more biasing members can be associated with the crotch belt strap engaging member for biasing such member outwardly from the cushion. As can be seen in FIG. 2, because of this biasing effect, the respective shoulder and lap seat belt straps in this example are held upwardly and away from the cushion when the seat belt structure is unstrapped. This makes it easy to place a child in the car seat, stroller or jogging stroller or other seat belt equipped seat prior to buckling the straps and reduces the need to have to fight the straps to place the child and straps in position.

In accordance with this disclosure, a first shoulder strap biasing element is desirably coupled to the body and to the first shoulder strap engaging member and configured to bias the first shoulder strap upwardly and outwardly. The biasing elements can take a number of forms, such as one or more elastic fabric strips, batting that has some elasticity with polyester batting being an example, or other resilient biasing elements (such as rubber or polymeric strips, bands or cords) that are desirably soft so they do not cause discomfort to the individual using the seat cushion. Similarly, the second shoulder strap biasing element is desirably coupled to the body and to the second shoulder strap engaging member and configured to bias the second shoulder strap upwardly and outwardly. In addition, a first lap belt strap biasing element is desirably coupled to the body and to the first lap belt strap engaging member and configured to bias the first lap belt strap engaging member upwardly and outwardly. In addition, a second lap belt strap biasing element is desirably coupled to the body and to the second seat lap belt strap engaging member and configured to bias the second lap belt strap engaging member upwardly and outwardly. Again, the crotch belt strap engaging member can be similarly biased by a crotch belt biasing element.

The biasing elements are positioned to exert tension on the back sides of the arm members, and desirably between the cushion body and a location of the back side of the arm member spaced from the cushion. Alternatively, the biasing elements can extend from one portion of an arm adjacent to the body to another portion of the arm that is more distally located from the body. Thus, the biasing elements can have a first end portion coupled to the body either directly connected to the body or indirectly connected to the body through an intervening structure such as a portion of a strap engaging arm. This tension or biasing force pulls the distal ends of the lap belt trap engaging members and the straps coupled thereto away from the center of the seat cushion and also desirably upwardly from the belted position (compare FIGS. 1 and 2) to provide a more easily accessible seat area for placing an individual onto the seat cushion. In a desirable embodiment, the biasing elements are also included in the shoulder strap engaging arms such that the tension or biasing force urges or pulls the shoulder straps upwardly and away from the central portion of the cushion; or assists in holding the should straps away from the anterior portion of the cushion. Although the biasing force can be varied, an exemplary biasing force is from 0.4 Newtons to 1.08 Newtons. The biasing elements desirably hold the distal ends of the strap engaging arms, spaced from the cushion away from the cushion when the seat belt components are disconnected.

Figure 3:
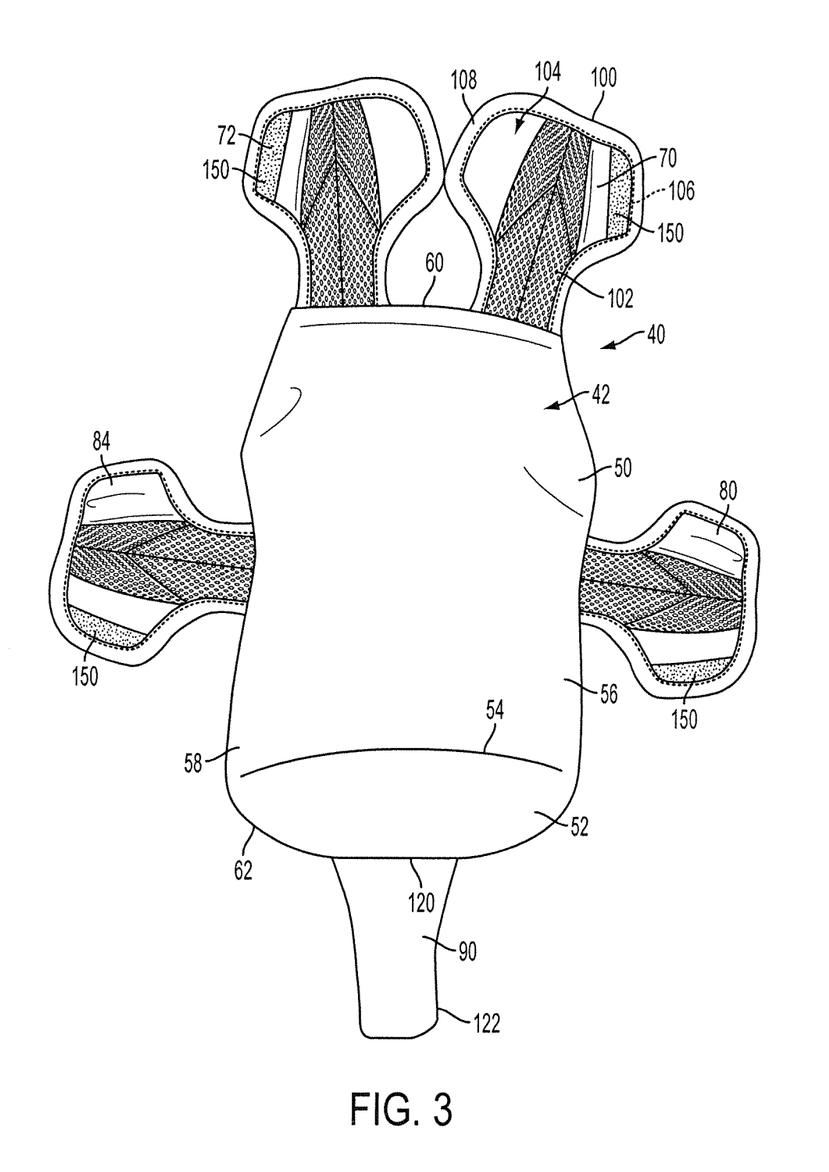
FIG. 3 is a front view of the cushion with respective shoulder strap engaging arms, first and second seat lap belt engaging arms and a crotch belt engaging projection shown in positions extending away from the main body of the cushion.
Figure 4:
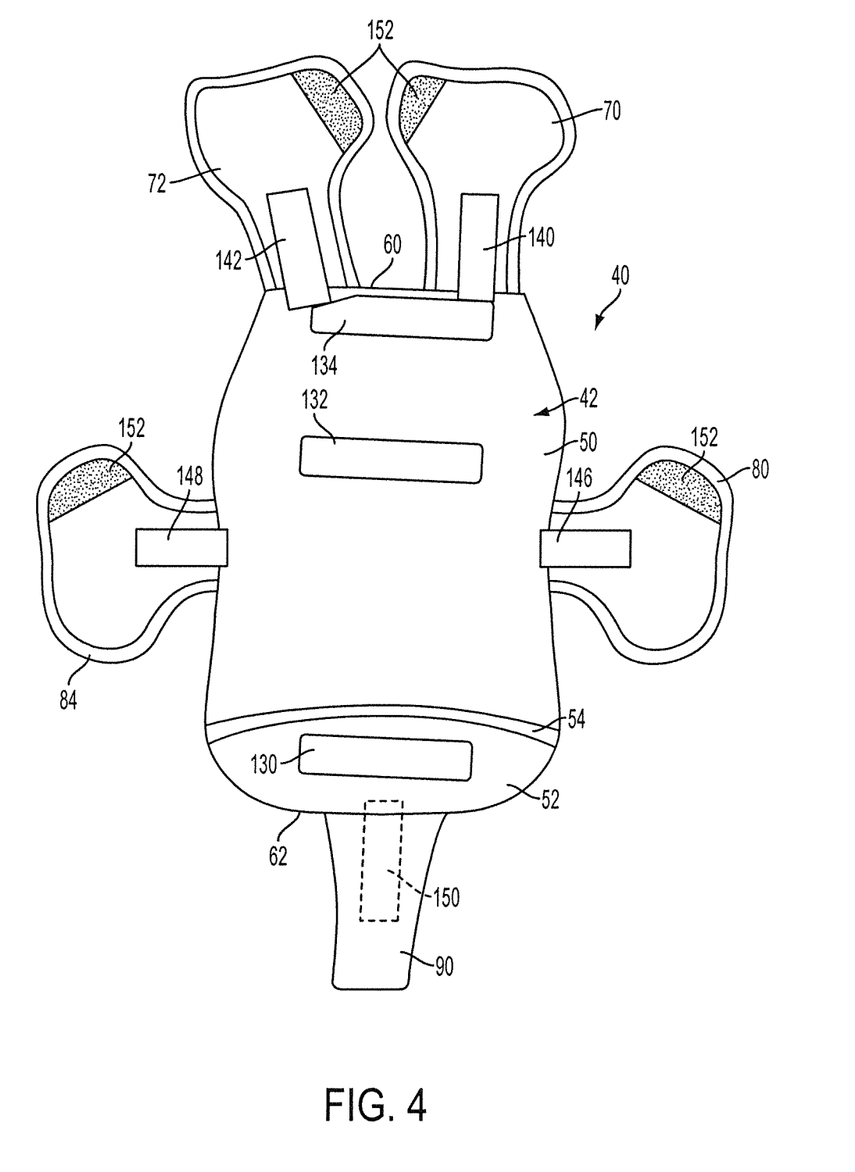
FIG. 4 illustrates the back view of the cushion of FIG. 3, with some exemplary hook and eye fastener strips shown horizontally thereon for use, if included, in detachably securing the cushion to a seat, such as to the seat of a jogging stroller, stroller or car seat.

With reference to FIGS. 3 and 4, the respective shoulder strap engaging members 70, 72 and lap belt strap engaging members or arms 80, 84 can be of a similar shape. Hence, only element 70 will be described in detail. The element 70 comprises a body 100 projecting outwardly from the associated portion of the cushion 50. The body comprises a neck portion 102 adjacent to the cushion and a head portion 104 spaced by the neck portion from the cushion. The head portion is enlarged relative to the neck portion 102. The illustrated head portion comprises first and second ear portions 106, 108. As will be explained further below, the respective ear portions are provided with a fastening mechanism, such as snaps or hook and eye fastening material such as sold under the trademark Velcro®, such that the respective ears can be detachably secured together to define an opening, such as a sleeve or channel through which the associated seat belt strap passes. The crotch engaging member 90 can be similarly constructed. However, since the crotch belt member passes between the legs of the user, it is typically somewhat tapered, being wider at its base or proximal end portion 120 where it engages the edge portion 72 of the cushion and narrower at a distal end portion 122 spaced from the proximal end portion 120. The member 90 typically has a closed sleeve (although it can be openable like the other sleeves) because it is easy to slip the crotch belt strap through the sleeve. As a result, the crotch belt strap engaging member easily fits between the legs of a child without placing undue pressure on the legs or crotch area of the child.

As can be seen in FIG. 4, respective fasteners, such as hook or eye fabric strips, 130, 132 and 134 can be positioned to extend transversely relative to the cushion in a side to side direction. Member 130 is positioned at the rear side of the cushion portion 52 on the cover sheet material for the back of the cushion; in this example positioned to engage a corresponding strip or element along the forward edge of the seat portion 14 of the jogging stroller. The element 130 can be stitched or otherwise secured to the cover sheet or cushion body. A fabric or other sheet material can also be used to cover the front side of the cushion. Such cover sheets can be of a durable material, such as polyester, and can comprise webbing or breathable material if desired. In the illustrated example, batting and/or foam is included between the cover and back sheets and can be held in place, such as by adhesive, stitching or other suitable mechanisms. The securing strip 132 can be positioned on the cushion body above the lap belt engaging members 80, 84 in a position to engage a corresponding strip or element on a lower portion of the main upper support portion 12 of the jogging stroller. The securing strip 134 can be positioned adjacent to an edge portion 60 of the cushion body in a position to engage a corresponding strip or element on an upper portion of the main upper support portion 14 of the jogging stroller. The strips can be hook and eye material, such as sold under the brand name Velcro®, in which case they would be detachably secured to corresponding strips mounted to the upper surface of the cushion of the stroller, car seat or the like.

In the embodiment of FIG. 4, respective stretchable elastic or resilient strips 140, 142, 146 and 148 are shown extending from an adjacent edge portion of the cushion to the associated arm or projection, such as to the upper or distal end of the neck portion of the associated respective shoulder strap and lap belt strap engaging members 70, 72, 80 and 84. These elastic strips assist in urging the associated strap engaging members upwardly and outwardly away from the cushion to thereby extend the shoulder straps away from the front of the cushion as shown in FIG. 2. The strips 140, 142, 144 and 146 are optional as other biasing members can be used in combination with or instead of such elements. Specific additional examples include stretchable polymeric or rubber bands or spring elements. The crotch strap engaging member 90 can similarly be provided with an elastic strip 150 extending from side edge portion 62 of the cushion to a central portion of the crotch strap 90. The element 150 is shown in dashed lines because the crotch strap can be provided without any biasing mechanism whatsoever and instead rely upon gravity to accomplish the biasing.

Figure 5:
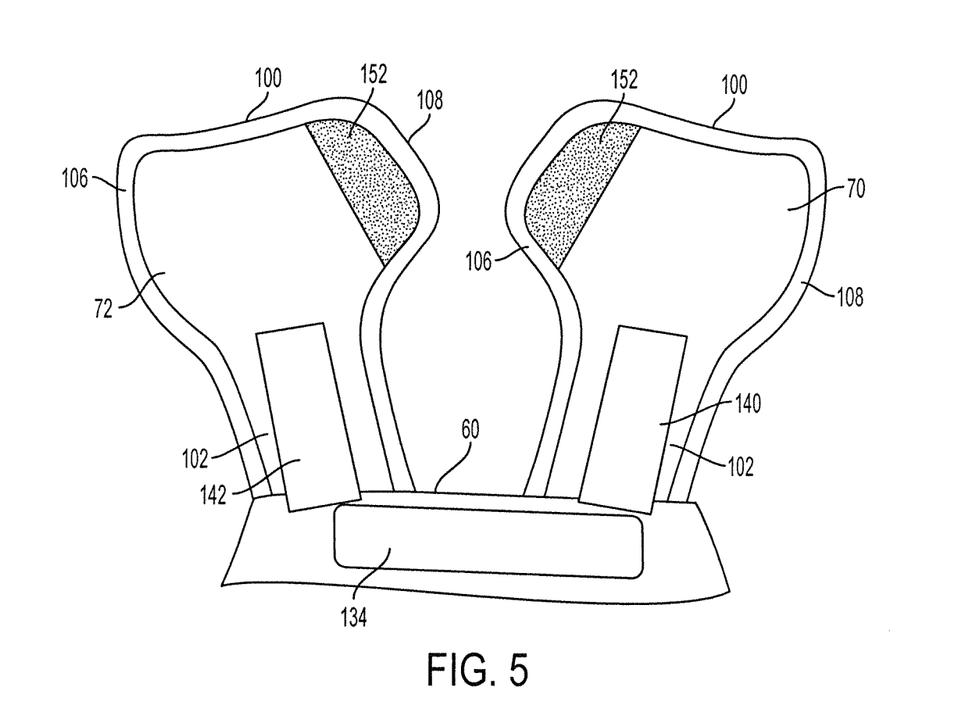
FIG. 5 is an enlarged view of the upper portion of the seat cushion of FIG. 4, showing exemplary shoulder strap engaging projections or arms.
Figure 6:
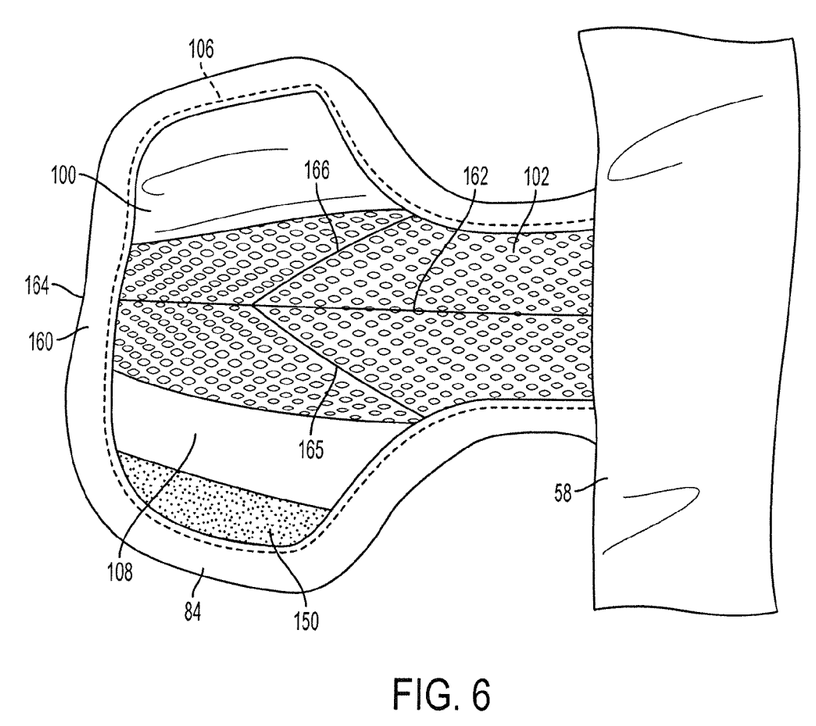
FIG. 6 is an enlarged front view of one of the lap belt receiving projections or arms.
Figure 7:
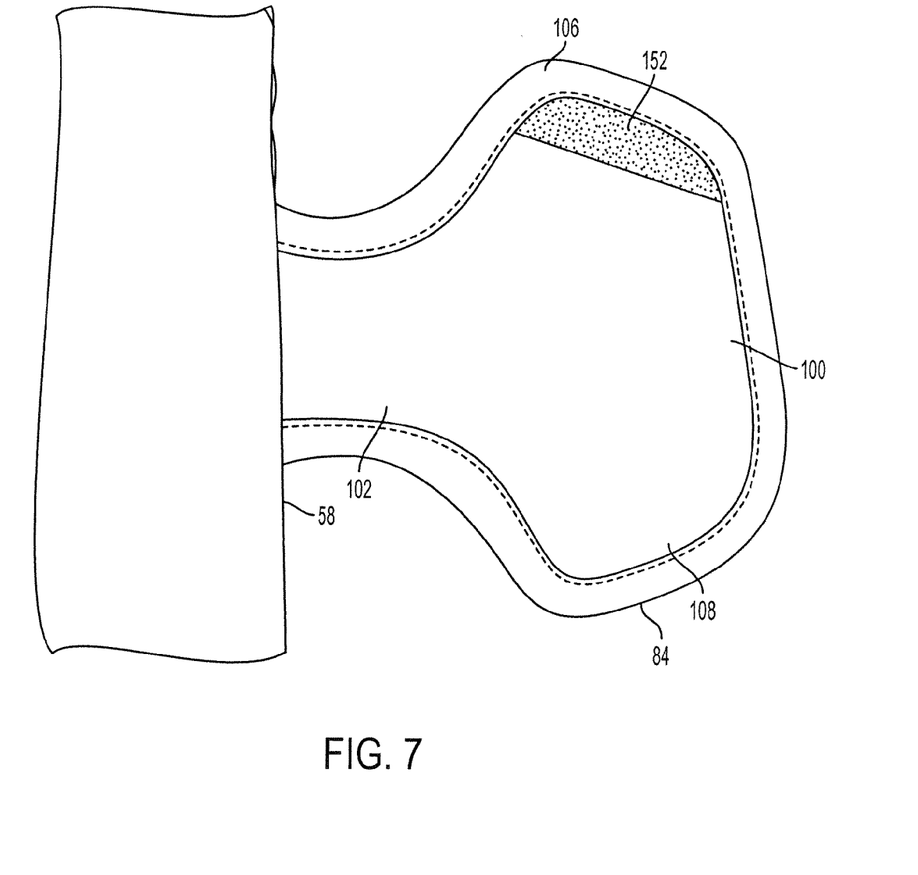
FIG. 7 is an enlarged back view of the projection or arm of FIG. 6.

FIGS. 5, 6 and 7 illustrate respective strap engaging members in greater detail. These elements will be described in connection with FIGS. 6 and 7. It should be noted that the strap engaging elements of FIGS. 6 and 7 lack the elastic strip biasing element of the embodiment of FIG. 4.

Referring to FIGS. 6 and 7, the lap belt strap engaging projection or member 84 is shown in greater detail. In these figures, FIG. 6 illustrates a front view of lap belt strap engaging member 84 and FIG. 7 illustrates a lap belt engaging member.

In as much as the aims 70, 72, 80 and 84 can be identical or substantially similar, only the details of strap engaging member or arm 84 will be described with reference to FIGS. 6 and 7. Referring to FIG. 6, the front view of the arm or projection 84 is shown. The illustrated arm 84 comprises a strip of looped or eye type fabric 150, used in a hook and eye fastening system. The strip 150 is stitched or otherwise secured along an outer edge of the ear 108 of the arm 84. The surface of ear 84 is covered with a webbing fabric 151 over which the strip 150 is positioned. A mesh material 153 extends from the side edge portion 58 of the cushion to the distal end 164 of the ear 84. An elastic or resilient batting material, such as polyester, with batting having a thickness of ½ inch to one inch being one example, extends from the cushion 58 toward the distal end 164. An axially extending seam 162 extends from the cushion edge portion to the distal end of the ear and anchors the batting in place and also partially secures an outer webbing layer 153. First and second seams 165, 166 are positioned at a location spaced from the side edge 58 of the cushion and serve to anchor an end portion of the batting at this location. The seam 165 is angled from a location near the distal end of the neck 102 adjacent to a side edge of the ear 108 and toward a location where it intersects the seam 162, this location being indicated at 171 in FIG. 6. Another seam 166 extends in a similar manner from a location near the distal end of the neck at the side edge of the ear 106 and toward the location 171. The seams 165, 166 can be in a chevron type pattern. The side edges of the web 153 are also secured in place, such as by stitching. In addition, the peripheral edge of the arm can be enclosed by edging 164 to close the edges of the arm.

With reference to FIG. 7, which illustrates the back side of the projection or arm 84, one can see a strip of hook element containing material 152 of a hook and eye fastening system stitched or otherwise secured along the edge 106 of the ear 84. The strip 152 engages the strip 150 when the lobes of the ear 106, 108 are folded over to thereby define the sleeve through which the lap belt strap, in this example, can pass. In FIG. 7, the number 108 indicates backing sheet material provided at the back of the arm.

Figure 8:
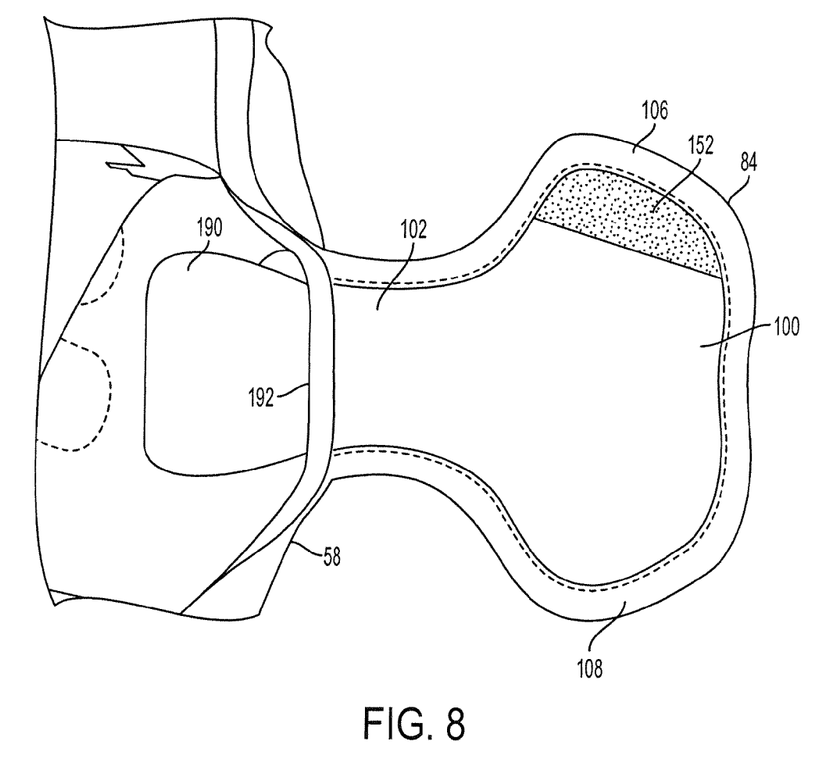
FIG. 8 illustrates one of the lap belt receiving projections with a portion of a back cover sheet removed to illustrate a biasing member extending into the arm. The biasing member in this example comprises batting that is secured to the cushion body and also to the projection at a location spaced from the cushion. The biasing element is positioned at the backside of the cushion body to assist in pulling the projection outwardly and upwardly away from the cushion when the projection engages a lap belt and the lap belt is unbuckled.
Figure 9:
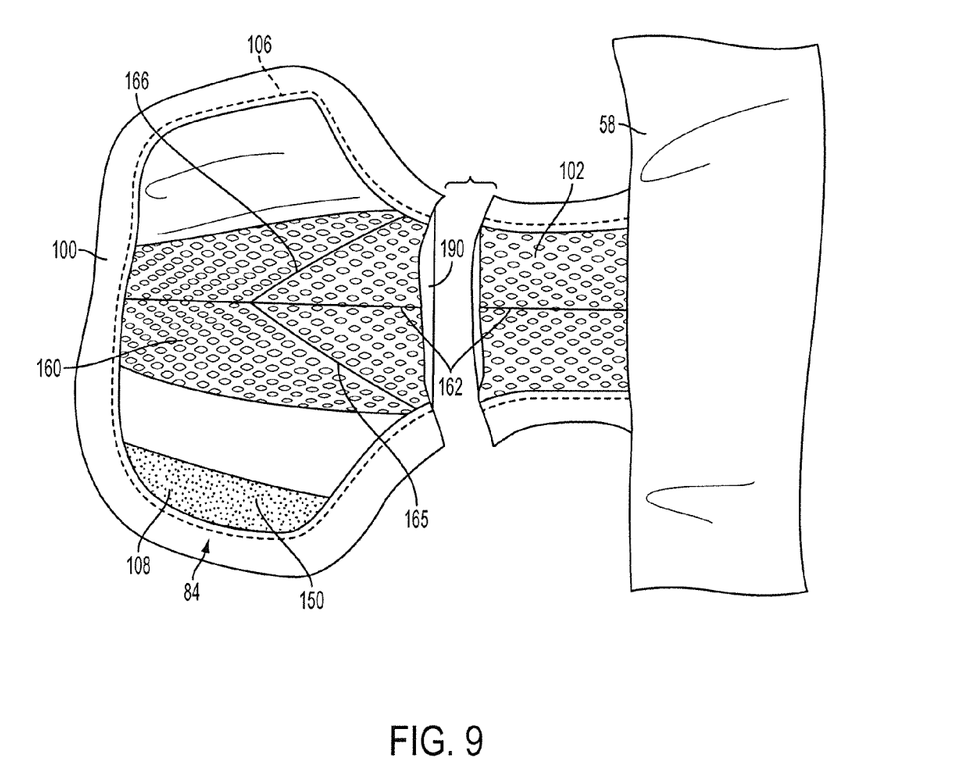
FIG. 9 is an exemplary view of one of the projections shown broken apart to expose some of the internal batting for view.

With reference to FIGS. 8 and 9, a biasing element in the form of batting material 190 is shown. Such material can be used in combination with other biasing elements, such as the elastic strip 148. The batting material again can comprise a resilient material, such as polyester, such as having a thickness of ½ inch to one inch. Alternatively, other elastic or stretchable materials can be used. The biasing element 190 is stitched, as indicated by stitching pattern 192, to the side edge 158 of the cushion at the back side of the cushion. In FIG. 8, a portion of the back covering of the cushion has been separated from the cushion to show the components as well as batting 191 located inside the seat cushion. FIG. 9 illustrates a sectional view through the ear 84 and again shows the batting 190 that acts as a biasing element.

Figure 10:
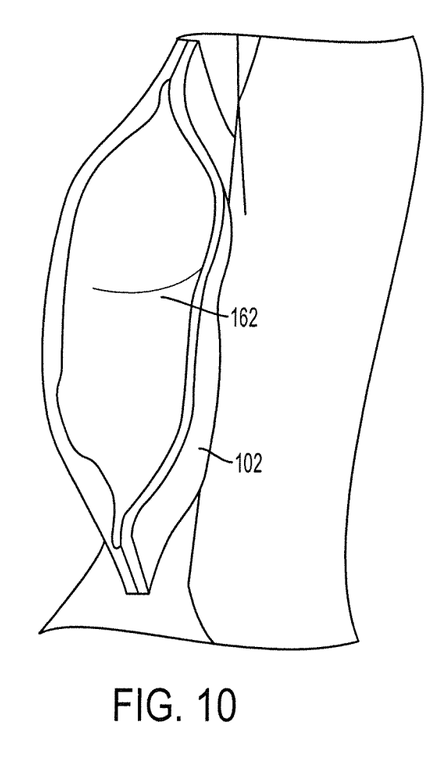
FIG. 10 is an end view of a portion of the projection of FIG. 9, looking back toward the cushion.

FIG. 10 illustrates an end view through the neck of the seat belt strap engaging member 84 showing the biasing batting 190 with the central elongated stitching seam 190 visible in this figure.

Having illustrated and described the principles of this invention with reference to exemplary embodiments, it should be understood that these embodiments may be modified in arrangement and detail without departing from the inventive principles described herein. It should also be understood that seat cushions in accordance with this disclosure can be used by individuals besides children, such as by disabled adults in wheelchairs. All such variations and modifications fall within the scope of this disclosure.

We claim:

1. A seat cushion comprising:
    a body comprising a central portion, first and second side portions and first and second end portions;
    first and second elongated spaced apart shoulder strap engaging members projecting outwardly from the first end portion of the body;
    a first elongated lap belt strap engaging member projecting outwardly from the first side portion of the body;
    a second elongated lap belt strap engaging member projecting outwardly from the second side portion of the body;
    an elongated crotch belt strap engaging member projecting outwardly from the second end portion of the body;
    the first and second elongated shoulder strap engaging members each having a proximal end portion coupled to the first end portion of the body and a distal end portion;
    the first and second lap belt strap engaging members each having a proximal end portion and a distal end portion, the proximal end portion of the first lap belt strap engaging member being coupled to the first side portion of the body, and the proximal end portion of the second lap belt strap engaging member second lap belt strap engaging member being coupled to the second side portion of the body;
    a first shoulder strap biasing element coupled to the body and to the first shoulder strap engaging member and configured to bias the distal end portion of the first shoulder strap engaging member away from the body;
    a second shoulder strap biasing element coupled to the body and to the second shoulder strap engaging member and configured to bias the distal end portion of the second shoulder strap engaging member away from the body;
    a first lap belt strap biasing element coupled to the body and to the first lap belt strap engaging member and configured to bias the distal end portion of the first lap belt strap engaging member away from the central portion of the body; and
    a second lap belt strap biasing element coupled to the body and to the second lap belt strap engaging member and configured to bias the distal end portion of the second lap belt strap engaging member away from the central portion of the body.

2. A seat cushion according to claim 1 wherein the crotch belt strap engaging member comprises a proximal end portion coupled to the second end portion of the body and a distal end portion, the seat cushion further comprising a crotch belt strap biasing element coupled to the body and to the crotch belt strap engaging member and configured to bias the distal end portion of the crotch belt strap engaging member away from the central portion of the body.

3. A seat cushion according to claim 2 wherein the first and second shoulder strap biasing elements, the first and second lap belt strap biasing elements, and the crotch belt strap biasing element each exert a biasing force of from 0.4 Newtons to 1.08 Newtons.

4. A seat cushion according to claim 1 wherein the first and second shoulder strap biasing elements and the first and second lap belt strap biasing elements each exert a biasing force of from 0.4 Newtons to 1.08 Newtons.

5. A seat cushion according to claim 1 wherein the first shoulder strap engaging member defines a first strap receiving opening that receives a first shoulder strap of a seat belt structure, the second shoulder strap engaging member defines a second strap receiving opening that receives a second shoulder strap of a seat belt structure, a first lap belt strap engaging member defines a third strap receiving opening that receives a first lap belt strap of a seat belt structure, the second lap belt strap engaging member defines a fourth strap receiving opening that receives a second lap belt strap of a seat belt structure, and the crotch belt strap engaging member defines a fifth strap receiving opening that receives a crotch belt strap of a seat belt structure.

6. A seat cushion according to claim 5 wherein the first, second, third and fourth strap receiving openings are each bounded by a respective associated sleeve, each sleeve comprising a first sleeve forming portion and a second sleeve forming portion that are detachably coupled together to form the sleeve and that are detachable from one another such that the first and second sleeve forming portions are separable from one another to receive a respective associated shoulder or lap belt strap and detachably coupled together to form the sleeve and define the strap receiving opening for the associated shoulder strap or seat belt strap.

7. A seat cushion according to claim 6 wherein the shoulder straps and lap belt straps are slidable within their associated sleeve.

8. A seat cushion according to claim 5 wherein the first and second shoulder strap engaging members and the first and second lap belt strap engaging members each comprise an enlarged distal end portion, the enlarged distal end portion comprising a first section and a second section, the first section being coupled to the second section to define the strap receiving opening.

9. A seat cushion according to claim 8 wherein the first and second sections are detachably coupled together to form the strap receiving opening.

10. A seat cushion according to claim 9 wherein a portion of one of the first and second sections is folded over the other of the first and second sections and the folded over portion of said one of the first and second sections is detachably coupled to said other of the first and second sections.

11. A seat cushion according to claim 1 wherein the body comprises a front portion and a back portion, the back portion facing a seat that has a seat belt structure with first and second shoulder straps, first and second lap belt straps and a crotch belt strap, the back portion of the body comprising fasteners that are operable to detachably mount the body to the seat.

12. A seat cushion according to claim 11 wherein the fasteners comprise a plurality of elongated hook or eye fabric strips positioned to engage corresponding hook or eye fabric strips on the seat.

13. A seat cushion according to claim 1 comprising a body comprising a front cover, a back cover and padding between the front and back covers.

14. A seat cushion according to claim 1 wherein the biasing elements comprise elongated elastic strips.

15. A seat cushion according to claim 14 wherein the biasing elements further comprise elongated batting strips.

16. A seat with a seat belt structure and a seat cushion comprising:
   a seat body having a central seat portion, a seat base portion and a seat back portion;
   the seat belt structure comprising first and second lap straps, a crotch strap, and first and second shoulder straps coupled to the seat body, the seat belt structure comprising at least one buckle operable to interconnect the shoulder straps, lap straps and crotch strap at a location over the central seat portion of the seat body;
   the cushion comprising a cushion body comprising a cushion back portion positioned over the seat back portion, a cushion seat portion positioned over the seat base portion, and first and second cushion side portions;
   the cushion further comprising first and second elongated spaced apart shoulder strap engaging members projecting upwardly and outwardly from the cushion back portion, a first elongated lap belt strap engaging member extending upwardly and outwardly from the first cushion side portion, a second elongated belt strap engaging member projecting upwardly and outwardly from the second cushion side portion, and an elongated crotch belt strap engaging member projecting outwardly from the cushion seat portion;
   the first and second elongated shoulder strap engaging members each having a proximal end portion coupled to the cushion body and a distal end portion;
   the first and second lap belt strap engaging members each having a proximal end portion and a distal end portion, the proximal end portion of the first lap belt strap engaging member being coupled to the cushion body and the proximal end portion of the second lap belt strap engaging member being coupled to the cushion body;
   a first shoulder strap biasing element coupled to the cushion body and to the first shoulder strap engaging member and configured to bias the distal end portion of the first shoulder strap engaging member upwardly away from the cushion body;
   a second shoulder strap biasing element coupled to the cushion body and to the second shoulder strap engaging member and configured to bias the distal end portion of the second shoulder strap engaging member upwardly away from the cushion body;
   a first lap belt strap biasing element coupled to the cushion body and to the first lap belt strap engaging member and configured to bias the distal end portion of the first lap belt strap engaging member away from the cushion body; and
   a second lap belt strap biasing element coupled to the body and to the second lap belt strap engaging member and configured to bias the distal end portion of the second lap belt strap engaging member away from the cushion.

17. A seat with a seat belt structure and a seat cushion according to claim 16 comprising fasteners on the seat and on the cushion body operable to detachably couple the cushion body to the seat body to permit removal of the cushion body from the seat when such fasteners are in a decoupled state.

18. A seat with a seat belt structure and a seat cushion according to claim 17 wherein the fasteners comprise hook and eye fastening material that cooperatively engage one another to detachably couple the cushion body to the seat body.

19. A seat with a seat belt structure and a seat cushion according to claim 16 wherein the seat cushion comprises a front cover, a back cover and padding therebetween; and wherein the biasing elements comprise elastic strips and batting strips.

20. A seat cushion comprising:
   a body comprising a central portion, first and second side portions and first and second end portions;
   first and second elongated spaced apart shoulder strap engaging members projecting outwardly from the first end portion of the body;
   a first elongated lap belt strap engaging member projecting outwardly from the first side portion of the body;
   a second elongated lap belt strap engaging member projecting outwardly from the second side portion of the body;
   an elongated crotch belt strap engaging member projecting outwardly from the second end portion of the body;
   the first and second elongated shoulder strap engaging members each having a proximal end portion coupled to the first end portion of the body and a distal end portion;
   the first and second lap belt strap engaging members each having a proximal end portion and a distal end portion, the proximal end portion of the first lap belt strap engaging member being coupled to the first side portion of the body, and the proximal end portion of the second lap belt strap engaging member second lap belt strap engaging member being coupled to the second side portion of the body;
   a first shoulder strap biasing element coupled to the body and to the first shoulder strap engaging member and configured to bias the distal end portion of the first shoulder strap engaging member away from the body;
   a second shoulder strap biasing element coupled to the body and to the second shoulder strap engaging member and configured to bias the distal end portion of the second shoulder strap engaging member away from the body;
   a first lap belt strap biasing element coupled to the body and to the first lap belt strap engaging member and configured to bias the distal end portion of the first lap belt strap engaging member away from the central portion of the body;
   a second lap belt strap biasing element coupled to the body and to the second lap belt strap engaging member and configured to bias the distal end portion of the second lap belt strap engaging member away from the central portion of the body;
   the crotch belt strap comprises a proximal end portion coupled to the second end portion of the body and a distal end portion, the seat cushion further comprising a crotch belt strap biasing element coupled to the body and to the crotch belt strap engaging member and configured to bias the distal end portion of the crotch belt strap engaging member away from the central portion of the body;

the first and second shoulder strap biasing elements, the first and second lap belt strap biasing elements, and the crotch belt strap biasing element each exert a biasing force of from 0.4 Newtons to 1.08 Newtons;

the first shoulder strap engaging member defines a first strap receiving opening that receives a first shoulder strap of a seat belt structure, the second shoulder strap engaging member defines a second strap receiving opening that receives a second shoulder strap of a seat belt structure, a first lap belt strap engaging member defines a third strap receiving opening that receives a first lap belt strap of a seat belt structure, the second lap belt strap engaging member defines a fourth strap receiving opening that receives a second lap belt strap of a seat belt structure, and the crotch belt strap engaging member defines a fifth strap receiving opening that receives a crotch belt strap of a seat belt structure;

the first, second, third and fourth strap receiving openings are each bounded by a respective associated sleeve, each sleeve comprising a first sleeve forming portion and a second sleeve forming portion that are detachably coupled together to form the sleeve and that are detachable from one another such that the first and second sleeve forming portions are separable from one another to receive a respective associated shoulder or lap belt strap and detachably coupled together to form the sleeve and define the strap receiving opening for the associated shoulder strap or seat belt strap;

the shoulder straps and lap belt straps are slidable within their associated sleeve;

the first and second shoulder strap engaging members and the first and second lap belt strap engaging members each comprise an enlarged distal end portion, the enlarged distal end portion comprising a first section and a second section, the first section being coupled to the second section to define the strap receiving opening;

the first and second sections are detachably coupled together to form the strap receiving opening;

a portion of one of the first and second sections is folded over the other of the first and second sections and the folded over portion of said one of the first and second sections is detachably coupled to said other of the first and second sections;

the body comprises a front portion and a back portion, the back portion facing a seat that has a seat belt structure with first and second shoulder straps, first and second lap belt straps and a crotch belt strap, the back portion of the body comprising fasteners that are operable to detachably mount the body to the seat; and comprising a body comprising a front cover, a back cover and padding between the front and back covers.

21. A seat cushion according to claim 20 wherein the biasing elements comprise elongated elastic strips and wherein the biasing elements further comprise elongated batting strips.

* * * * *